Patented June 22, 1926.

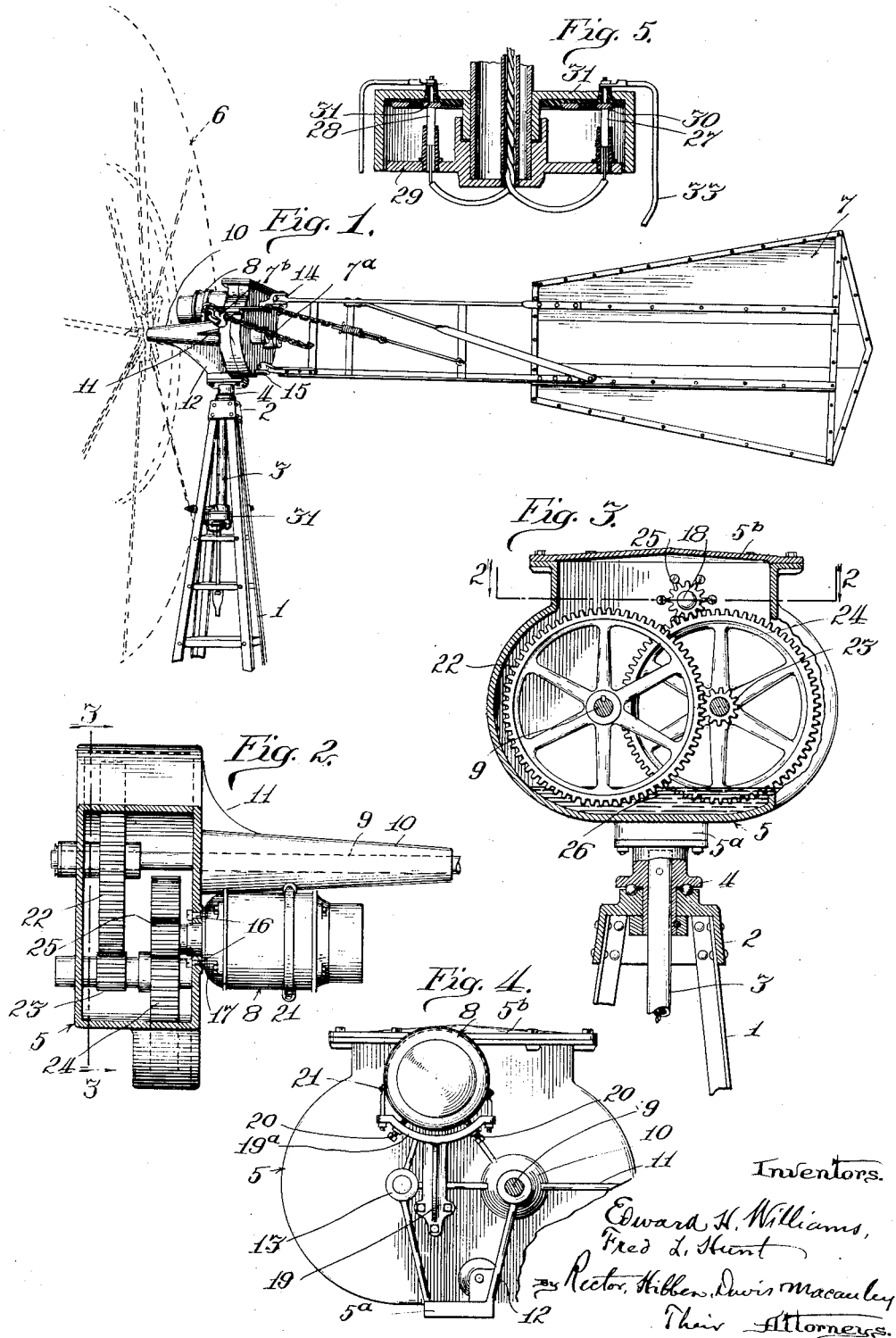

1,589,828

UNITED STATES PATENT OFFICE.

EDWARD H. WILLIAMS, OF SOUTH BEND, AND FRED L. HUNT, OF MISHAWAKA, INDIANA, ASSIGNORS TO PERKINS CORPORATION, OF SOUTH BEND, INDIANA, A CORPORATION OF INDIANA.

WINDMILL FOR GENERATING ELECTRIC ENERGY.

Application filed February 23, 1922. Serial No. 538,636.

Our invention relates to a mechanical structure which comprises a casing and associated parts including a wind wheel and rudder and electric generator designed to be supported on a tower or other suitable elevated structure and constituting a wind-driven machine for generating an electric current adapted to be used as part of an apparatus for utilizing the power of the wind to supply electric power for various purposes, as domestic lighting, operating light household and farm machinery arranged to be electrically driven, etc. The wind-wheel and rudder and electric generator may vary in details of construction, inasmuch as our invention relates more particularly to the organization of the machine, and the arrangement and construction of the supporting structure and actuating mechanism, and not to the specific construction of the parts mentioned. The object of our invention is the development of such a structure as will most efficiently serve the purposes in view, which can be economically manufactured and which will be of a rugged, durable and desirable character especially adapted to serve as part of a wind-mill for supplying electric energy in an installation such as that above mentioned. With this object in view we have devised and invented the windmill for generating electric energy which will hereinafter be described, and our invention resides in the organization, arrangement and construction of associated and cooperating parts and members of such structure, the essential elements of our invention being more particularly pointed out in the appended claims.

Figure 1 of the drawings is a perspective view of a windmill embodying my invention; Fig. 2 is a horizontal section of the gear casing on the line 2—2 of Fig. 3; Fig. 3 is a vertical section on the line 3—3 of Fig. 2 looking towards the wind-wheel as indicated by the arrow; Fig. 4 is a side view of the casing, looking towards the rudder; and Fig. 5 is a detail of the electrical connection permitting rotation of the wheel frame.

The same reference characters indicate the same parts in all the figures of the drawing.

As illustrated in the drawing, the windmill to which my invention is shown as applied may be conveniently supported on a skeleton tower 1 of suitable construction at the top of which is a cap-piece 2 arranged to pivotally receive the hollow vertical shaft 3 of a turntable 4, the turntable being supported upon the cap-piece by a thrust bearing, preferably a roller or ball bearing to minimize friction. The lower end of the shaft 3 pivotally engages the housing member 32 of a truing spider which is rigidly secured to and forms part of the supporting tower, and which will later be mentioned again. To the turntable 4 is bolted the bearing frame 5, which in the present instance includes a main casting enclosing the gearing and arranged to support the wheel 6, rudder 7 and electric generator 8 of the machine. As shown in Figs. 2, 3 and 4, above the base 5ª, the walls of the casing surround and enclose the gear wheels connecting the wind-wheel with the generator, forming a closed gear chamber which is partly filled with oil so that the gearing is kept constantly lubricated. The top of the gear chamber is tightly closed by a cover plate 5ᵇ.

To provide a long bearing for the shaft 9 of the wind-wheel, the main casting is formed with an elongated cone or ball 10 formed with a bearing member at its outer end and strengthened by a flange 11 connecting the cone with the adjacent side wall of the casing, and a flange 12 connecting it with such side wall and the base of the casting. Strengthening flanges also extend between a bearing hub 13 on the same wall of the casting and the base 5ª, and between such hub and the base of the cone 10.

The windmill herein illustrated is of a well known type in which the rudder or vane is hung to the rotating frame by upper and lower pivots, of which upper pivot is further from the axis of rotation of the frame on the tower than the lower, and the axis of rotation of the wind-wheel in the frame passes slightly to one side of the axis of rotation of said frame, the angular relations of the vane and wheel being such with respect to their proportions that variations of wind pressure and consequently of end thrust on the wind wheel shaft will cause the wind wheel to automatically turn more or less out of the wind and thus cause the rudder, which is held by the wind in the line of its movement, to rise against the force of gravity as the wind velocity increases and fall by gravity as the velocity decreases, the weight of the rudder thus returning the wheel towards a position at right angles to the direction of the wind. In this manner the effect of the wind upon the supporting frame at different angles of the wheel to the wind is balanced against the weight of the rudder, and a substantially uniform wind wheel speed maintained. In our machine it will be noted that the shaft 9 of the wind wheel is offset from the shaft 3 of the turntable (see Fig. 3), and the upper bearing bracket 14 and lower bearing bracket 15 by which the rudder is supported are of different lengths for the reasons just explained. It may here be explained that by means of a chain 7 attached to the rudder and passing over pulleys 7$^b$ and 7$^c$ and connected to a hand pull, the rudder may be positively swung on its hinges and lifted to cause the wheel to turn out of the wind.

The electric generator of the machine is secured to the gear casing by a series of bolts 16 engaging screw-threaded sockets in the neck 17 of the generator casing surrounding the armature shaft 18, ground faces on the contiguous members being provided to ensure an accurate and substantial seating of the generator casing. The generator is further braced and supported by a bracket 19 formed with a curved cross arm 19 the ends of which carry short threaded supporting studs 20 which are screwed up in their seats in the arm into contact with the generator casing. A sheet metal strap 21 passing over the top of the generator casing and secured by screw bolts to the opposite ends of the cross-arm 19 further provides for holding the generator securely in place.

As shown in Figs. 2 and 3 the train of multiplying gearing for transmitting power from the windwheel shaft to the electric generator comprises a gear wheel 22 fixed to the wind-wheel shaft, a pinion 23 meshing with said gear wheel, a gear wheel 24 fixed to the shaft upon which the pinion 23 is mounted, and a pinion 25 secured to the generator shaft. The shafts of these gear members are preferably supported in roller bearings, to minimize friction. The gear wheels 22 and 24 dip into a body of oil 26 in the lower part of the gear chamber and keep the train of gearing lubricated.

The current generated by the generator is led through conductors passing through the hollow shaft 3 to a pair of insulated conducting brushes 27, 28, which are carried by a plate 29 secured to the lower end of said shaft, and are arranged to contact insulated rings 30 and 31 supported by the stationary housing member 32 before referred to which forms part of the truing spider structure. The wheel frame is thus free to rotate on its vertical axis while maintaining electrical connection with the rings, which latter are in electrical connection through suitable cables 33 and 34 with the apparatus to be operated by the current generated by the machine. In the ordinary installation for domestic purposes for which our machine was more particularly designed it will be understood that the conductor cables have terminals on a panel board which are electrically connected and associated with apparatus for controlling and utilizing the current, such as an ammeter, a voltmeter, a storage battery, fuses, switches, relay connections, etc.

We claim:

1. A windmill for generating electric energy comprising a support, a main frame rotatably mounted on said support and formed with a closed gear casing arranged to support speed-multiplying gearing, a wind wheel rotatably mounted on said frame and connected to said gearing, an electric generator including an armature and an armature shaft also connected to said gearing and having a casing formed with a neck surrounding said armature shaft, a seat in the wall of said gear chamber to receive said neck, clamping bolts arranged circumferentially about said generator casing neck arranged to clamp said generator casing to said gear casing, a bracket extending from the wall of the gear casing to a remote part of the generator casing and formed with a cross arm at its outer end, said cross arm being equipped adjacent its opposite ends with supporting screws, and an adjustable strap secured to the opposite ends of said cross arm and passing around the generator casing.

2. A windmill for generating electric energy comprising a supporting tower, a mill head rotatably mounted on said mill head and having a depending hollow spindle, a wind wheel and an electric generator connected with said wind wheel mounted on said mill head, the electrical conductors of said generator passing through said hollow spindle, a truing spider on said tower below said mill head rotatably engaging said spindle, a housing member secured to said spider and having a depending peripheral flange, a plate fitting within said flange secured to the lower end of said spindle and equipped with contact brushes electrically connected with said conductors, and contact rings cooperating with said brushes secured to said housing on the inside thereof.

EDWARD H. WILLIAMS.
FRED L. HUNT.